(12) United States Patent
Gutt et al.

(10) Patent No.: US 9,612,334 B2
(45) Date of Patent: Apr. 4, 2017

(54) CORRECTING FOR TIME DELAY VARIATION IN A SATELLITE FOR POSITIONING, NAVIGATION OR TIMING APPLICATIONS

(71) Applicant: THE BOEING COMPANY, Chicago, IL (US)

(72) Inventors: Gregory Gutt, Ashburn, VA (US); David A. Whelan, Newport Coast, CA (US); Peter M. Fyfe, Irvine, CA (US); James C. Lassa, Leesburg, VA (US)

(73) Assignee: The Boeing Company, Chicago, IL (US)

( * ) Notice: Subject to any disclaimer, the term of this patent is extended or adjusted under 35 U.S.C. 154(b) by 1192 days.

(21) Appl. No.: 13/664,115

(22) Filed: Oct. 30, 2012

(65) Prior Publication Data

US 2013/0293415 A1   Nov. 7, 2013

Related U.S. Application Data

(60) Provisional application No. 61/556,080, filed on Nov. 4, 2011.

(51) Int. Cl.
| | |
|---|---|
| *G01S 19/07* | (2010.01) |
| *G01S 5/02* | (2010.01) |
| *G01S 19/02* | (2010.01) |
| *G01S 19/40* | (2010.01) |

(52) U.S. Cl.
CPC .............. *G01S 19/07* (2013.01); *G01S 5/021* (2013.01); *G01S 19/02* (2013.01); *G01S 19/40* (2013.01)

(58) Field of Classification Search
CPC .......... G01S 19/07; G01S 19/40; G01S 19/02; G01S 5/021
See application file for complete search history.

(56) References Cited

U.S. PATENT DOCUMENTS

| | | | |
|---|---|---|---|
| 7,423,585 B2* | 9/2008 | Tekawy | G01S 19/02 342/174 |
| 7,952,518 B2 | 5/2011 | Whelan et al. | |
| 2004/0228368 A1* | 11/2004 | Jecmen | G01S 5/021 370/519 |
| 2010/0164782 A1* | 7/2010 | Saha | H04B 7/18515 342/174 |
| 2011/0032859 A1* | 2/2011 | Wirola | G01S 19/05 370/312 |
| 2011/0085626 A1* | 4/2011 | Busson | H04B 1/18 375/346 |
| 2011/0248887 A1 | 10/2011 | Whelan et al. | |
| 2012/0131650 A1 | 5/2012 | Gutt et al. | |
| 2012/0144451 A1 | 6/2012 | Gutt et al. | |

* cited by examiner

*Primary Examiner* — Cassie Galt
(74) *Attorney, Agent, or Firm* — Charles L. Moore; Moore & Van Allen PLLC (57) ABSTRACT

A method for correcting for time delay variations between a plurality of signal paths from a signal source to at least one transmit antenna of a satellite may include measuring a time delay for each of the plurality of signal paths. The method may also include correcting a signal for the time delay variation based on the time delay for the signal path that is currently being used by the satellite, the corrected signal being usable for at least one of navigation, determining a geographic location and determining time.

32 Claims, 9 Drawing Sheets

CORRECTING FOR TIME DELAY VARIATION IN A SATELLITE FOR POSITIONING, NAVIGATION OR TIMING APPLICATIONS

CROSS-REFERENCE TO RELATED APPLICATIONS

The present application claims benefit of priority to U.S. Provisional Application No. 61/556,080 filed on Nov. 4, 2011, the contents of which are hereby incorporated by reference herein in its entirety. This application is related to U.S. patent application Ser. No. 12/949,404, filed Nov. 18, 2010, entitled "Spot Beam Based Authentication," and U.S. patent application No. 13/114,013, filed May 23, 2011, entitled "Geolocating Network Nodes in Attenuated Environments for Cyber and Network Security Applications", which are both assigned to the assignee as the present application and are hereby incorporated herein in their entirety.

FIELD

The present disclosure relates to positioning, navigation and timing applications using satellite signals, and more particularly to a method and system for correcting for time delay variations between a plurality of signal paths in a satellite.

BACKGROUND

Satellites broadcast signals that may be used for navigation and which may include measurements of position and/or time that may alternatively be used for these specific applications. Signals broadcast from Global Positioning System (GPS) satellites, Global Navigation Satellite System (GLONASS) satellites, BeiDou Navigation System (COMPASS) satellites, and Galileo satellites are designed to be used for navigation. Signals from other satellites, while not specifically designed for navigation, may also be used for navigation. This may include at least one satellite such as a low earth orbiting (LEO) Iridium satellite or a GlobalStar satellite.

In such satellites and/or satellite systems, consistent timing of signal transmission is required for accurate satellite navigation. In particular, a consistent time delay due to the signal path is desired. This refers to the time a signal is generated by a signal source inside a satellite until the time the signal is transmitted by a transmit antenna on the satellite. In satellite systems that are designed to be used for navigation, care is taken to ensure the time delay is, to a large extent, constant or that it changes very slowly over time, since time delay variations introduce an error in the accuracy of the time of arrival measurements at a receiver of signals transmitted by the satellite.

SUMMARY

In accordance with an embodiment, a method for correcting for time delay variations between a plurality of signal paths from a signal source to at least one transmit antenna of a satellite may include measuring a time delay for each of the plurality of signal paths. The method may also include correcting a signal for the time delay variation based on the time delay for the signal path that is currently being used by the satellite, the corrected signal being usable for at least one of navigation, determining a geographic location and determining time.

In accordance with another embodiment, a method for correcting for time delay variations between a plurality of signal paths from a signal source to at least one transmit antenna of a satellite may include transmitting a signal by one of the signal paths of the plurality of signal paths of the satellite. The method may also include correcting the signal for the time delay variation of the signal path that transmitted the signal by applying a calibrated time delay value for the signal path to the signal. The calibrated time delay value may be determined from a measured time delay for the one signal path. The corrected signal may be usable for at least one of navigation, determining a geographic location and determining time.

In accordance with another embodiment, a satellite may include a signal source for generating a signal and at least one transmit antenna. The satellite may also include a plurality of selectable signal paths between the signal source and the at least one transmit antenna. The plurality of selectable signal paths may include time delay variations between the signal source and the at least one transmit antenna. The satellite may additionally include a processor; and a module operating on the processor to determine the time delay variation based on the time delay for the signal path that is currently being used by the satellite to transmit signals. The time delay variation may be used to correct the signal and the corrected signal may be usable for at least one of navigation, determining a geographic location and determining time.

In accordance with further embodiment, a receiver may include an antenna for receiving a signal from a satellite, wherein the satellite comprises a plurality of selectable signal paths from a signal source to at least one transmit antenna. The plurality of selectable signal paths may include time delay variations between the signal source and the at least one transmit antenna. The receiver may also include a processor and a module operating on the processor to correct the signal for the time delay variation based on a time delay for the signal path that is currently being used by the satellite to transmit signals. The corrected signal may be usable for at least one of navigation, determining a geographic location and determining time.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
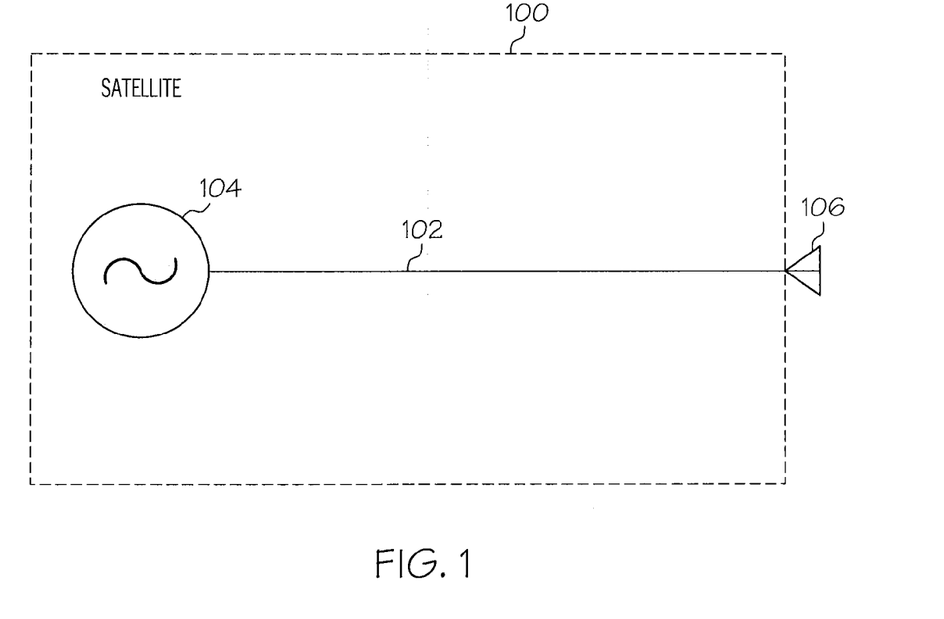
FIG. 1 is an example of a satellite including a signal path from a signal source to a transmit antenna.
Figure 2:
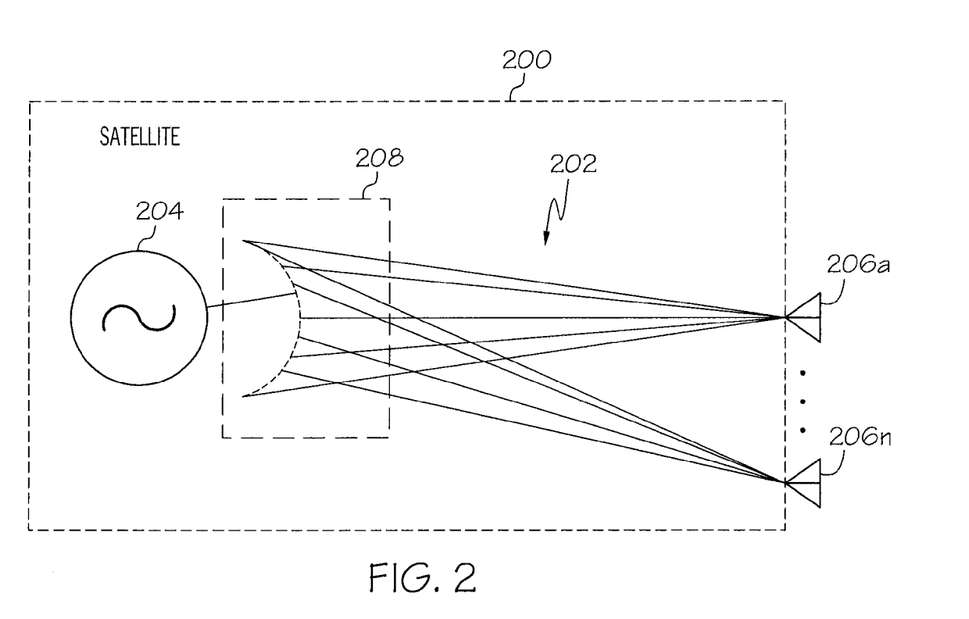
FIG. 2 is an example of a satellite including a plurality of selectable signal paths from a signal source to one of a plurality of transmit antennas.

FIG. 1 is an example of a satellite 100 including a signal path 102 from a signal source 104 to a transmit antenna 106. With only a single signal path 102 time delay variations will not be a concern. However, there are satellites that may not have been designed specifically for navigation, which may have a time delay between the signal source and the transmit antenna. FIG. 2 is an example of a satellite 200 including a plurality of selectable signal paths 202 from a signal source 204 to one or more transmit antenna 206a-206n. In this configuration the time delay may change significantly and quickly. A switch mechanism 208 may be used to alternate between different signal paths 206a-206n which may result in the multiple possible signal paths. Such a switch mechanism 208 may be used to provide flexible communication channel management. The switch mechanism 208 may be used to select between different signal paths which results in multiple possible signal paths that are necessary to provide the flexibility needed for communication channel management. The satellite 200 may also be one of a plurality of satellites within a satellite system or constellation. Examples of such satellite systems or constellations may include a Low Earth Orbiting (LEO) satellite constellation, such as the Iridium satellite constellation and the planned future Iridium constellation, known as Iridium NEXT, or a combination of these two systems or similar satellite systems.

One possible phenomenon associated with varying signal paths is that, the signal paths effective length may change. For example, a signal traveling down a longer signal path at a speed, v, will experience a larger time delay than a signal traveling down a similar but shorter signal path at the same speed, v, and the time delay for each path is expected to be consistent over time. Such differences in time delay will introduce errors if the satellite signal is to be used for navigation (or similarly other positioning and timing related applications).

For many standard satellite navigation techniques, time delay is important because position fixes are calculated by using the time of arrival of a signal from a satellite to estimate the range to that satellite. Thus, a time-varying or incorrectly calibrated time delay will cause errors to be introduced into this range measurement.

Figure 3:
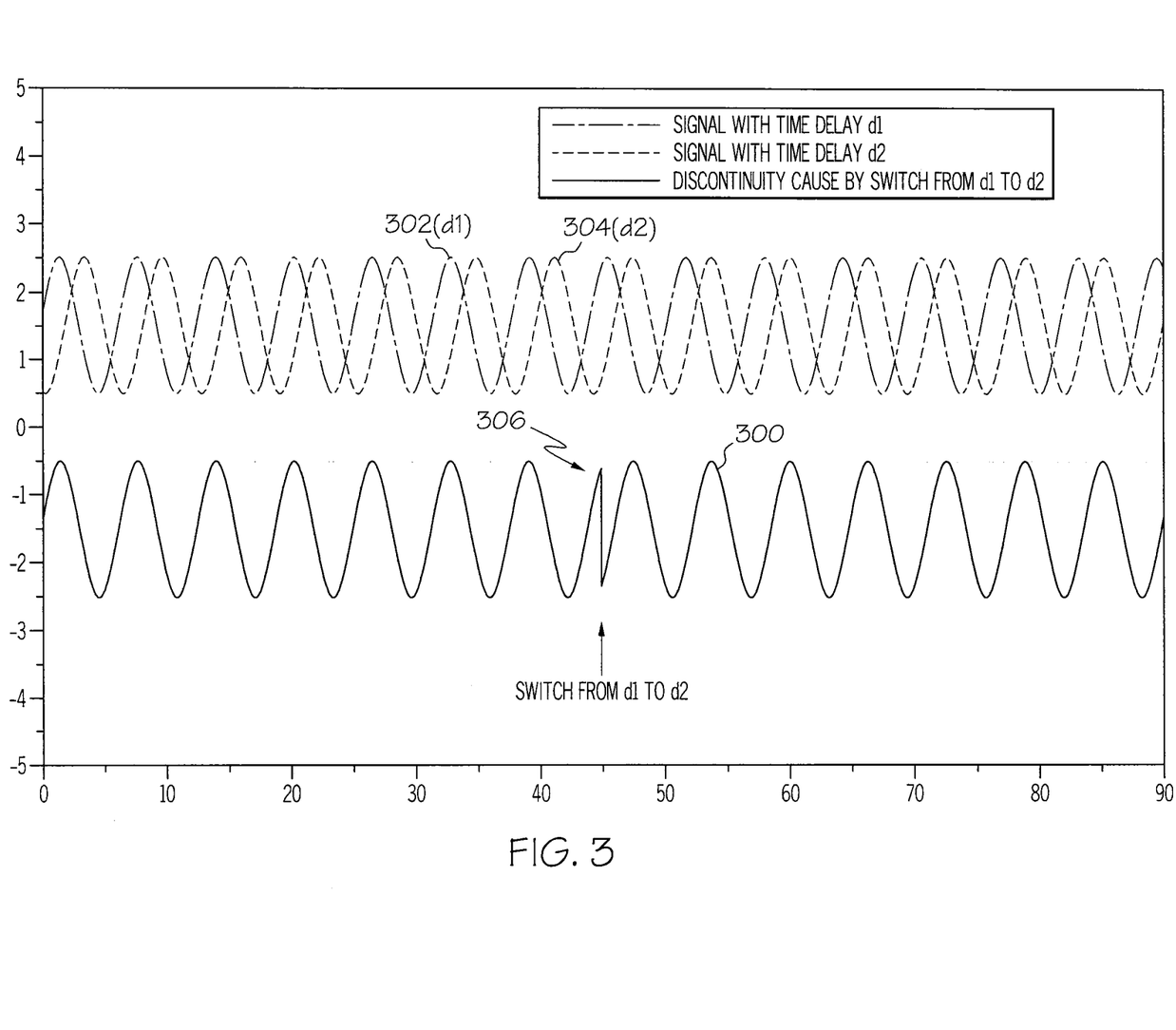
FIG. 3 is an example of a signal being transmitted by a satellite that has switched from one signal path with a time delay d1 to another signal path with a delay d2.

Some satellite navigation techniques rely on a continuous carrier phase signal to be transmitted by the satellite. Switching from one signal path to another signal path can result in a jump or fast change in the time delay and jumps or inconsistencies in the continuity of the carrier phase signal, which can cause navigation errors. FIG. 3 is an illustration of an example of a signal 300 being transmitted by a satellite that has switched from one signal path that transmits a signal 302 with a time delay d1 to another signal path that generates a signal 304 with a delay d2. The switching from the signal path with the delay d1 to the signal path with the delay d2 results in the discontinuity 306 which can cause navigation, positioning and timing errors.

In some cases, a receiver tracking the signal can detect such a jump in carrier phase and can either correct the error, disregard the error, or disqualify the erroneous signal when computing its navigation solution. In at least some embodiments, this receiver may be used for positioning navigation, and/or timing (PN&T) applications.

Figure 4:
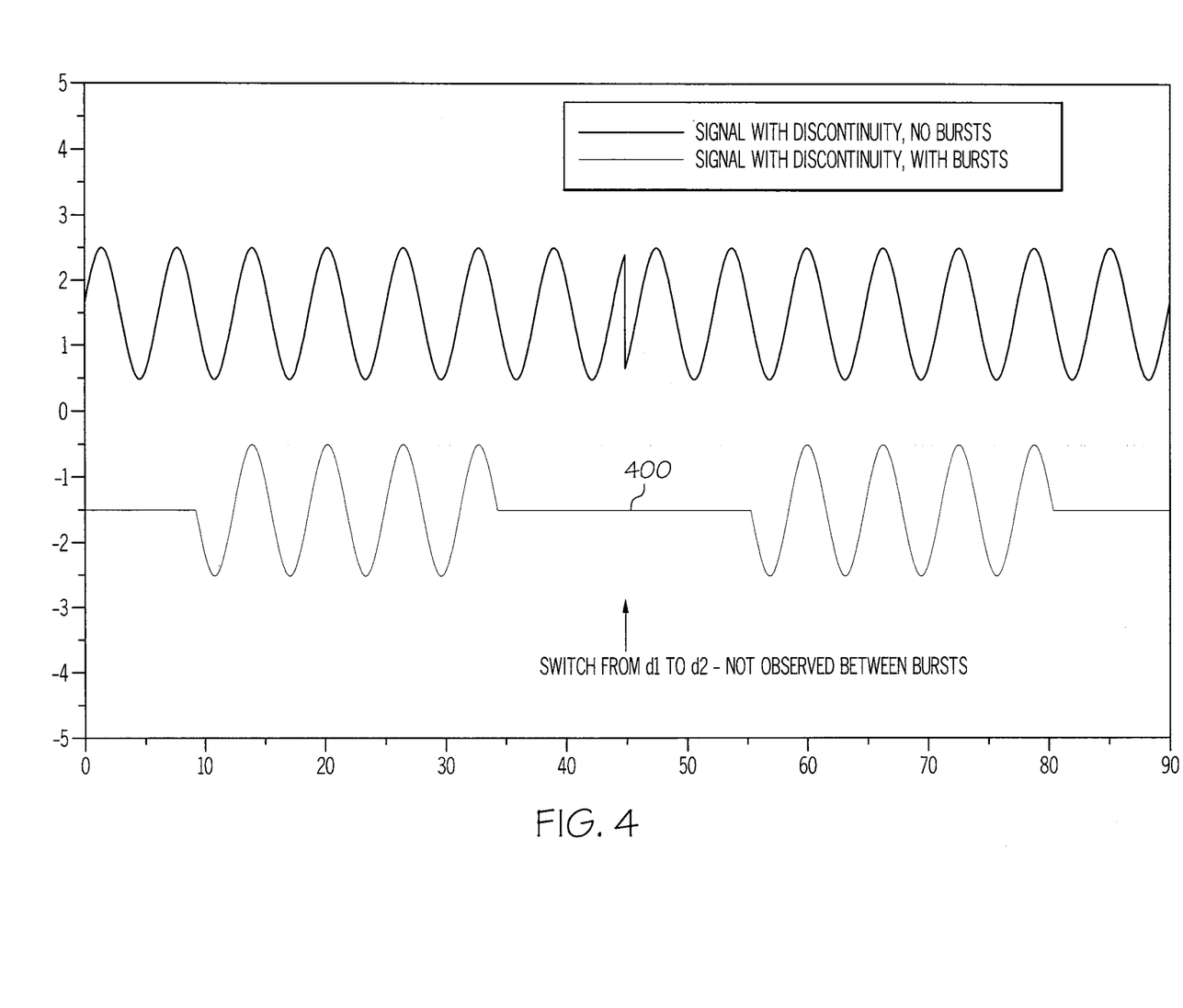
FIG. 4 is an example of a signal being transmitted by a satellite that switches from one signal path with one time delay to another signal path with another time delay between signal bursts.

However, in some cases such jumps can be particularly problematic. For instance, if the signal being used for navigation is sent in bursts, and the change in time delay occurs between two bursts, then the signal jump may be unobservable by the receiver. FIG. 4 is an example of a signal 400 being transmitted by a satellite that switches from one signal path with one time delay to another signal path with another time delay between signal bursts. As described in more detail herein, such carrier phase discontinuities that are caused by signal path switching can be compensated for in hardware and/or software.

As used herein a satellite may be any satellite that transmits or broadcasts signals and may include a Lower Earth Orbiting (LEO) satellite, a Medium Earth Orbiting (MEO) satellite, and/or a Geosynchronous Earth Orbiting (GEO) satellite. The satellite may be one of a plurality of satellites within a satellite system or constellation. In at least one embodiment, there may be at least two satellites where each satellite has a different satellite design and may or may not be from a different satellite constellation.

Methods or operations described herein may be embodied at least partially in and performed at least in part by an Iridium LEO satellite constellation, where each of the satellites in the constellation has an antenna geometry that transmits spot beams. In at least one embodiment, the satellite or satellites may be an Iridium NEXT satellite. It may be important to note, that an Iridium satellite's transmission signal power may be sufficiently strong to allow for its signal to penetrate deeper into an attenuated environment than many other known position, navigation and timing systems. This transmission signal power may allow for many indoor position, navigation and timing applications including those related to cyber, network, and computing security.

Figure 5:
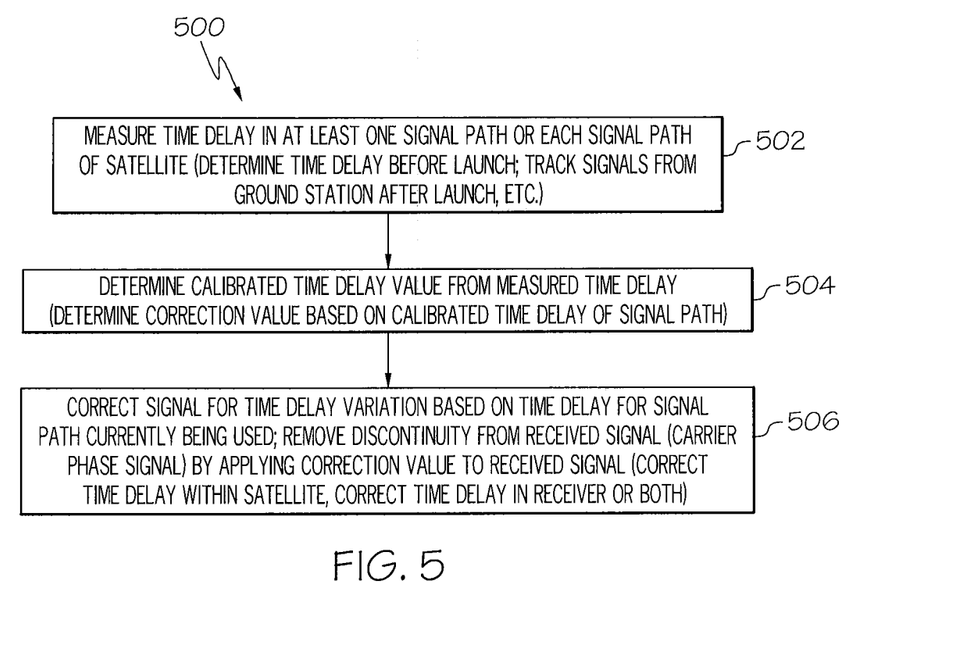
FIG. 5 is a flow chart of an example of a method for correcting for time delay variations between a plurality of signal paths from a signal source to at least one transmit antenna of a satellite in accordance with an embodiment of the present disclosure.

FIG. 5 is a flow chart of an example of a method 500 for correcting for time delay variations between a plurality of signal paths from a signal source to at least one transmit antenna of a satellite in accordance with an embodiment of the present disclosure. In block 502, a time delay may be measured in at least one signal path or each signal path of the satellite. A calibrated time delay may be determined for the at least one signal path or each signal path based on the measured time delay. The time delay for the at least one signal path or each signal path may be measured before the satellite is launched or after the satellite is in orbit. The time delay of the signal paths may be measured during the manufacturing and test process of the satellite. Alternatively, signals from the satellite may be tracked or monitored from a ground station, such as earth station 606 in FIG. 6, while a satellite is on orbit after launch. The time delays for the signal paths may also be measured before and after launch. In some embodiments, there are more than one signal path that requires being measured and calibrated. Time delay measurements after launch of the satellite may be made by a ground station, such as ground or earth station 606 in FIG. 6. The ground station may include a high quality clock (i.e. frequency standard), high gain antenna and detailed knowledge about the satellite and/or satellite's signal path structure to detect the delay between channels or signal paths of the satellite.

In block 504, a calibrated time delay value may be determined from the measured time delay for each signal path or at least some of the signal paths. For example, the calibrated time delay value may be determined by adding a time delay to the measured time delay for a particular signal path so that the total time delay for each signal path is substantially equal. Accordingly, for the signal path with the longest measured time delay, no additional delay would be added. Each signal path with a measured time delay shorter than the longest measured time delay will be calibrated by adding a time delay to the measured time delay for the signal path so that the total time delay is substantially equal to the longest measured time delay. The calibrated time delays for each signal path may be substantially equal because measuring precise time delays may be difficult because of conditions of when the time delay measurements are performed either before or after the satellite is launched. These calibrated time delays may be used to generate a correction value that is based on which signal path is currently being used on the satellite. Then, for example, a navigation receiver tracking the satellite can apply the correction value in software or hardware.

In block 506, a signal generated by the satellite may be corrected for the delay variation between signal paths for the signal path that is currently being used by the satellite. The corrected signal may then be useable for at least one of navigation, determining geographic location, and determining time.

Applying the correction removes or minimizes discontinuities in the carrier phase signal that may be caused by switching between signal paths. Carrier phase discontinuities may be minimized by switching between signal paths with substantially similar time delays for a predetermined time period. As described in more detail herein, signals may be corrected for time delay variation within the satellite that transmits the signals or in the receiver. In other embodiments, the correction for time delay variations between signal paths may be corrected in a combination of within the satellite and the receiver.

Figure 6:
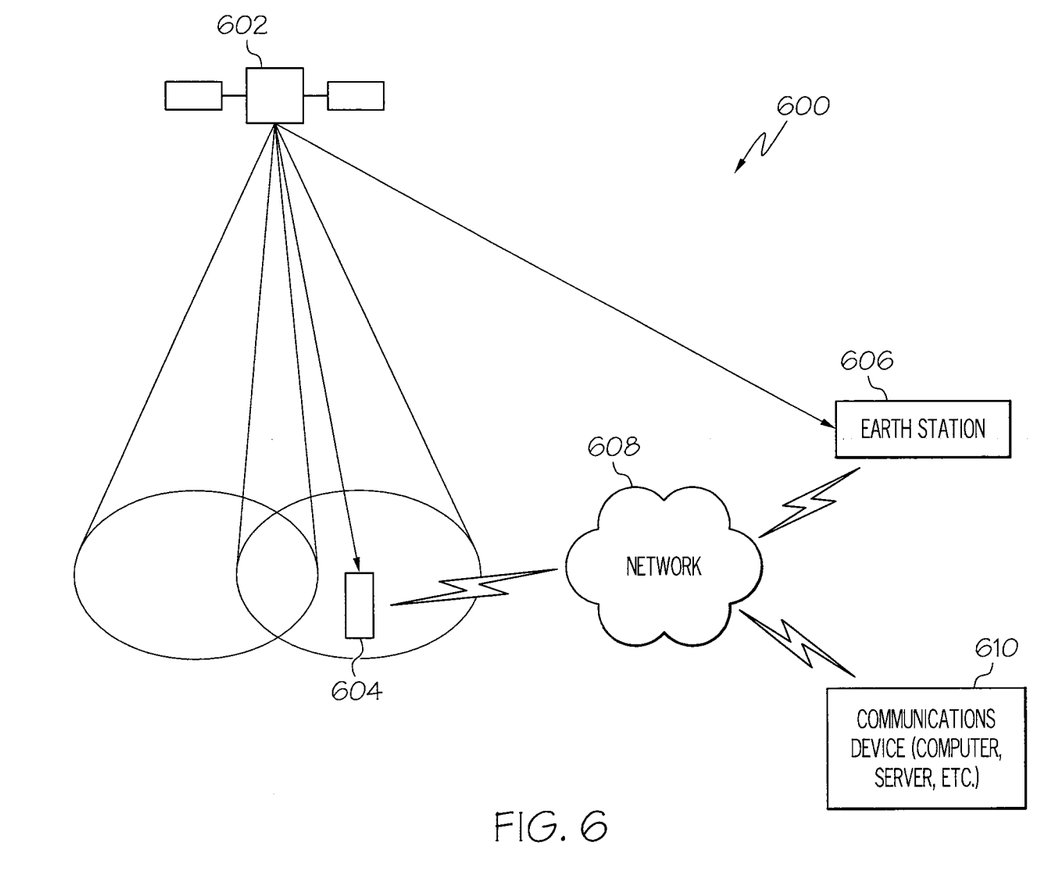
FIG. 6 is an example of a system for correcting for time delay variations between a plurality of signal paths from a signal source to at least one transmit antenna of a satellite in accordance with an embodiment of the present disclosure.

Referring also to FIG. 6, FIG. 6 is an example of a system 600 for correcting for time delay variations between a plurality of signal paths from a signal source to at least one transmit antenna of a satellite 602 in accordance with an embodiment of the present disclosure. An example of the satellite 602 including a plurality of signal paths from a signal source to one of more transmit antennas will be described in more detail with reference to FIGS. 11 and 12. Operations and functions of the method 500 may be embodied in and performed by elements of the system 600. For example, portions of method 500 may be performed by the satellite 602, the receiver 604 and the earth station 606 similar to that previously described. The system 600 may also include a communications device 610 that may communicate with the receiver 604 and the earth station 606 via a network 608. The network 608 may be any type of communications network including but not necessarily limited to a wireless network, wire line network or any combination thereof.

Figure 7:
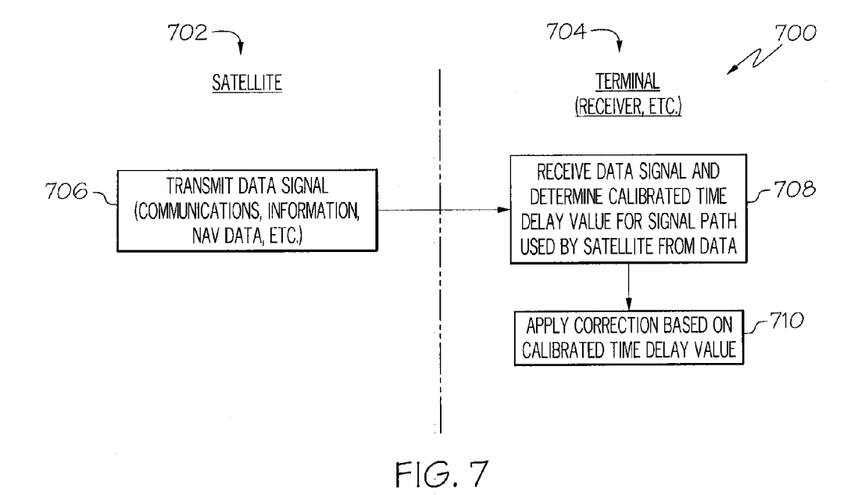
FIG. 7 is a flow chart of an example of a method for correcting for time delay variations between a plurality of signal paths from a signal source to at least one transmit antenna of a satellite in accordance with another embodiment of the present disclosure.

FIG. 7 is a flow chart of an example of a method 700 for correcting for time delay variations between a plurality of signal paths from a signal source to at least one transmit antenna of a satellite in accordance with another embodiment of the present disclosure. The exemplary method 700 shows those features or operations that may be performed by a satellite 702 and those features or operations that may be performed by a terminal or receiver 704. In block 706, a data signal or data signals may be transmitted by the satellite 702 to the receiver 704. In block 708, the receiver 704 may receive the data signal or signals. The receiver 704 may determine the correction or calibrated time delay value for the signal path currently being used in the satellite 702 from the data received. The data received may include the correction value or calibrated time delay value.

In block 710, the receiver 704 may directly use this calibrated time delay or calibrated time delay value to apply the correction.

Figure 8:
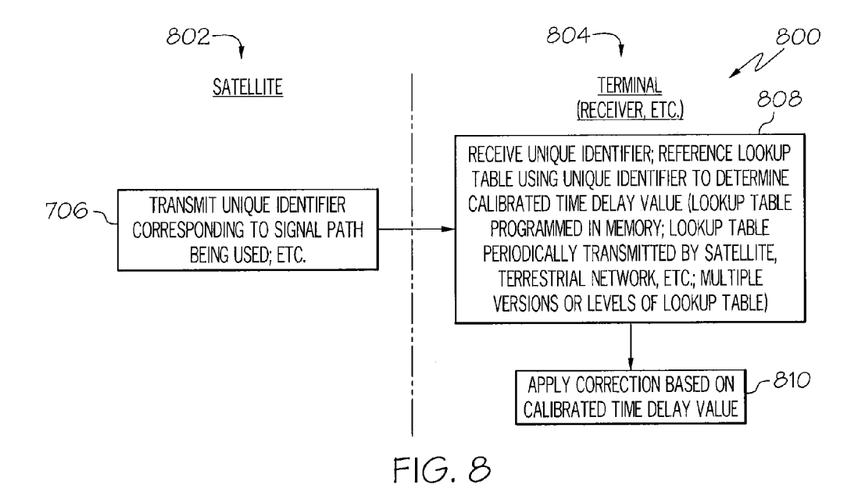
FIG. 8 is a flow chart of an example of a method for correcting for time delay variations between a plurality of signal paths from a signal source to at least one transmit antenna of a satellite in accordance with a further embodiment of the present disclosure.

FIG. 8 is a flow chart of an example of a method 800 for correcting for time delay variations between a plurality of signal paths from a signal source to at least one transmit antenna of a satellite in accordance with a further embodiment of the present disclosure. The exemplary method 800 shows those features or operations that may be performed by a satellite 802 and those features or operations that may be performed by a terminal or receiver 804. The method 800 includes the receiver 804 knowing, based on data from the satellite 802, which signal path is being used. Each signal path in the satellite 802 may have a unique identifier such as an integer identifier. In block 806, the satellite 802 may transmit the unique identifier corresponding to the signal path currently being used. In block 808, the receiver 804 may receive the unique identifier. The receiver may then reference into a look-up table to determine which calibrated time delay value should be applied for the signal path being used. The receiver may then use this calibrated time delay to apply the correction. The look-up table may be known to the receiver a priori or via other means. In one embodiment at least a portion of the look-up table may be programmed into a memory of the receiver 804. At least a portion of the look-up table may be broadcast, from time to time, from the satellite, from another satellite or satellites or from a terrestrial network, such as network 608 in FIG. 6, in the form of data messages. The satellite broadcasting the message may be at least one Low Earth Orbiting (LEO) satellite, and more specifically, at least one Iridium satellite. Furthermore, the broadcasting message may emanate from at least one Iridium NEXT satellite. In some embodiments, the satellite or satellites that broadcast at least a portion of the look-up table data messages are the same as the satellite or satellites for which the time delay variation is being corrected. In other embodiments, a different satellite or satellites may broadcast this data. In another embodiment, at least a portion of the look-up table may broadcast from a terrestrial network. In yet another embodiment, at least a portion of the look-up table may be downloaded from a terrestrial network, such as network 608, by cellular or WiFi internet connection. A terrestrial network may include at least one of: a router, a server, a personal computing device, a personal digital assistant (PDA), a cellular phone, a computer node, an internet protocol (IP) node, a network node, a gateway, a Wi-Fi node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and a fourth generation (4G) wireless node.

In some embodiments, a portion of the look-up table may be programmed into the memory of the receiver and then updates may be received by one of the previously described methods (via a satellite broadcast, terrestrial network, etc.) and used to update the look-up table that is in-memory.

In block 810, the correction or calibrated time delay value may be applied to the signal in the receiver 804 based on the signal path currently being used by the satellite 802.

Figure 9:
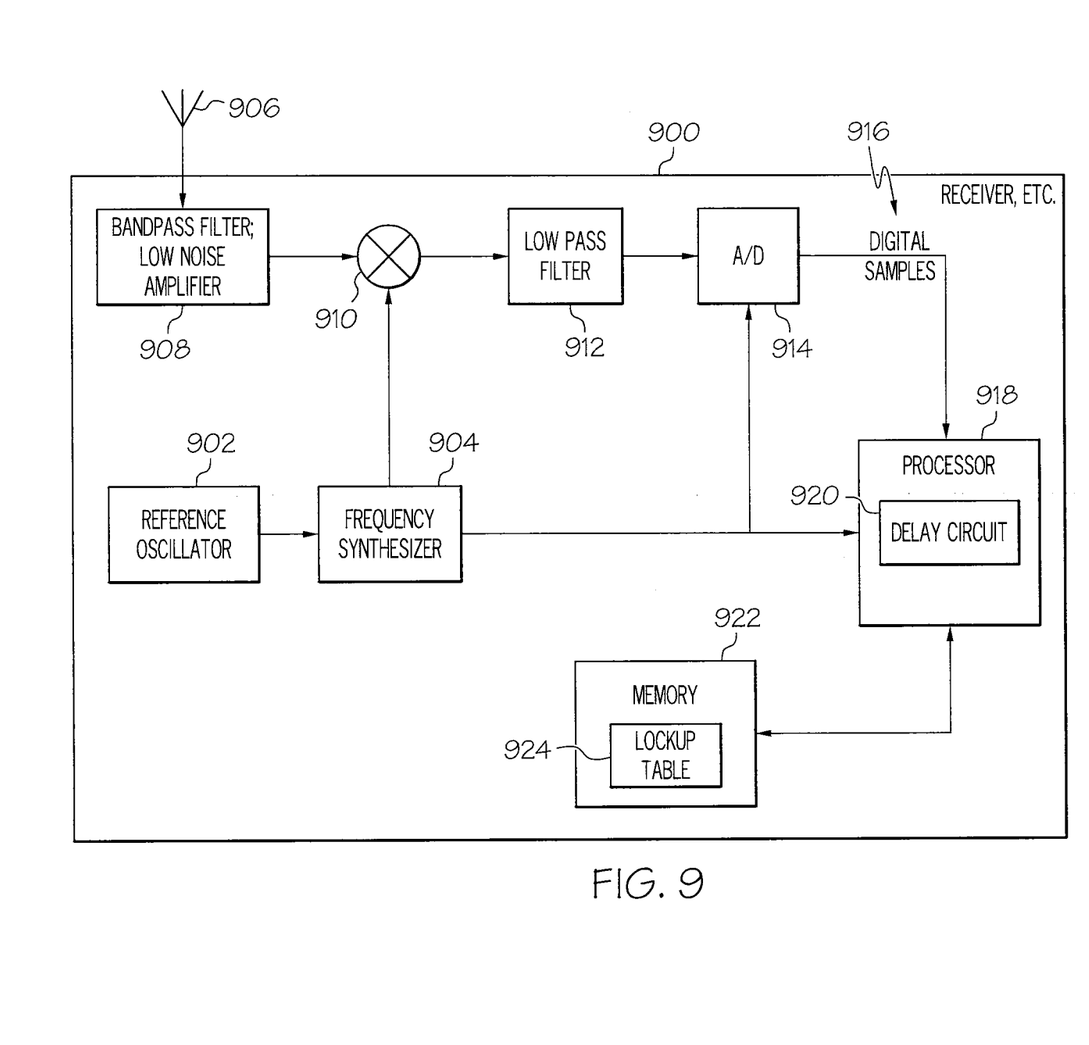
FIG. 9 is a block schematic diagram of an example of a receiver for correcting for time delay variations between a plurality of signal paths from a signal source to at least one transmit antenna of a satellite in accordance with another embodiment of the present disclosure.

FIG. 9 is a block schematic diagram of an example of a receiver 900 for correcting for time delay variations between a plurality of signal paths from a signal source to at least one transmit antenna of a satellite in accordance with an embodiment of the present disclosure. At least portions of the methods 500, 700 and 800 may be embodied in and performed by the receiver 900 similar to that previously described. The receiver 900 may include a reference oscillator 902 and a frequency synthesizer 904 to provide timing references for the receiver 900. Signals from a satellite may be received by an antenna 906. The satellite signals may be passed through a bandpass filter (BPF) and low noise amplifier (LNA) 908. The bandpass filter and low noise amplifier 908 may be combined in a single component as illustrated in FIG. 9 or may be separate components. The output of the bandpass filter and low noise amplifier 908 and an intermediate frequency from the frequency synthesizer 904 may then be passed through a multiplier 910 and a low pass filter (LPF) 912 to down convert the signal to a lower frequency band. The output of the low pass filter 912 may be sampled by an analog-to-digital (A/D) converter 914 to generate digital samples 916 which may be collected and stored by a processor 918. The processor 918 may be responsible for formatting and sending at least some of these digital samples such as to an authentication server, for example server 610 in FIG. 6. The processor 918 may include a delay circuit or module 920 to perform the correction for time delay variations similar to that described herein. When implemented in the processor 918, the delay module 920 may be implemented as a digital delay. Alternatively, the delay module may introduce delay terms mathematically into the navigation equations used for at least one of navigation, determining a geographic location, and determining time. In another embodiment, there may be a delay circuit or module between the analog-to-digital converter 914 and the processor 918 with a control line coming from the processor 918. In another embodiment a delay block or circuit may be placed between the frequency synthesizers 904 and the multiplier 910 with a control line coming from the processor 918. The receiver 900 may also include a memory 922 including a lookup table 924 that may be used for correcting for the time delay variations similar to that previously described herein.

Figure 10:
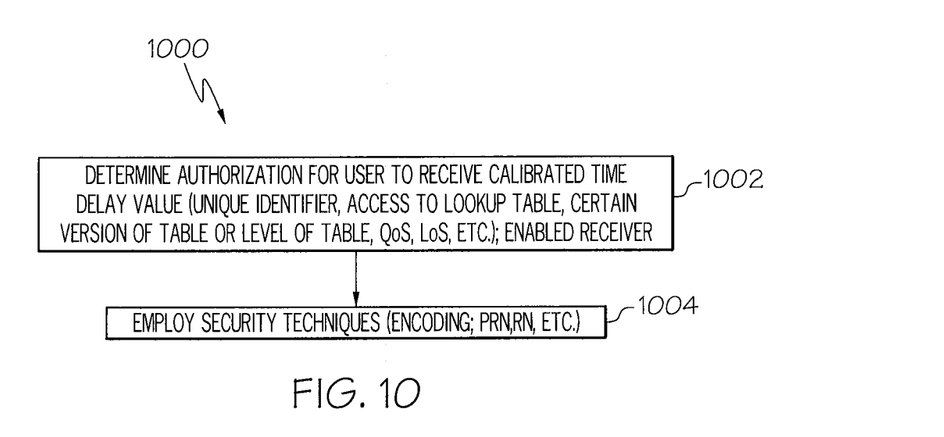
FIG. 10 is a flow chart of an example of a method for restricting receipt of time delay information to one of an authorized user or receiver in accordance with an embodiment of the present disclosure.

FIG. 10 is a flow chart of an example of a method 1000 for restricting receipt of time delay information to one of an authorized user or receiver in accordance with an embodiment of the present disclosure. In block 1002, authorization for at least one of a user and a receiver to receive at least one of the calibrated time delay value or other correction data, signal path identification data, look-up table information or other information may be determined. It may be desired to restrict the accessibility of the calibration information and/or at least a portion of the look-up table that is transmitted to the user or user's receiver.

In at least one embodiment, only authorized users have access to at least a portion of the look-up table (whereas unauthorized users may not have access to it). In another embodiment, there may be at least two versions of a look-up table or at least two levels of the look-up table where one version or level includes more precise data or more accurate correction information than the other. In one embodiment, a plurality of users may be provided access to the more precise version of the look-up table. In an alternate embodiment, a plurality of users may be restricted from accessing more precise or accurate versions or levels of the look-up table. In at least one embodiment, there may be more than two levels of a look-up table. In one or more embodiments, the preciseness or accuracy of the calibrated delay values of the look-up table is related to a corresponding level of service (LoS). This corresponding LoS may include two or more different levels of service that may be tied to different versions of the look-up table. For example, a lookup table for the highest tier level of service would represent the best estimate possible. Other tables for lower levels of service may not be as refined or precise and may include data making them less accurate. For example, fewer bits of information may be provided for each member of the table. Another way table entries may be less accurate would be to round the numbers in a decimal sense. For example, the ideal table may have a calibration value of 1.23456, and a less accurate table may provide the value 1.23, which has been rounded to the nearest hundredths. Yet a third way to introduce less accuracy or precision may be to simply add or subtract random numbers to each element of the table. Random numbers with a lower standard deviation may be used in calibration tables providing a higher level of service.

In some embodiments, the preciseness or degree of accuracy of the calibrated delay values of the look-up table may be related to a corresponding quality of service (QoS). This corresponding QoS may include two or more different levels. In at least one embodiment, each different QoS level has an associated corresponding LoS. In one embodiment, there may be at least two levels of quality of service wherein each level has a different factor of error incorporated in to it. In at least one embodiment, the highest quality of service is associated with the level with the least amount of error. In at least one embodiment, the lowest quality of service is associated with the most amount of error. In at least one embodiment, QoS level has no error. In one or more embodiments, each different QoS level has an associated priority. In at least one embodiment, the priority is dependent upon the importance of the set of users. In at least one embodiment, each different QoS level has an associated rate of data transmission.

In some of these embodiments, the authorized users have enabled receivers (either utilizing software or hardware) that can demonstrate that they are authorized. In other embodiments, the authorized users may have enabled receivers that may require authentication and/or authorization methods to prove that they are indeed authorized to access the data.

In block 1004, the transmission source for the calibration information and/or look-up table may further employ techniques to maintain the security of the data and/or system. These techniques may include signal encoding methods and/or providing at least one pseudo-random number (PRN) or random number (RN). In at least one embodiment, the broadcasted message burst content associated with these signals includes random data or pseudorandom noise data. Since a given message burst may occur within a specific satellite spot beam at a specific time, the message burst content may include pseudorandom noise data and unique beam parameters (e.g., time, satellite identification (ID), beam identification (ID), time bias, orbit data, etc.). An example of spot beam authentication that may be utilized herein is described in U.S. patent application Ser. No. 12/494,404, filed Nov. 18, 2010, entitled "Spot Beam Based Authentication," which has been incorporated herein by reference. In at least one embodiment, the PRN/RN and/or the unique beam parameters may be used to authenticate the location of a receiver on the ground. In at least one embodiment, authentication of a receiver may take place prior to transmission of the calibration and/or look-up table information in order to aid in restricting the accessibility of the information to a subset of the population. In at least one embodiment the RN, is generated by a random number generator on the satellite. Another method for authenticating a receiver is described in U.S. patent application Ser. No. 13/114,013, filed May 23, 2011, entitled "Geolocating Network Nodes in Attenuated Environments for Cyber and Network Security Applications," which has also been incorporated herein by reference.

Figure 11:
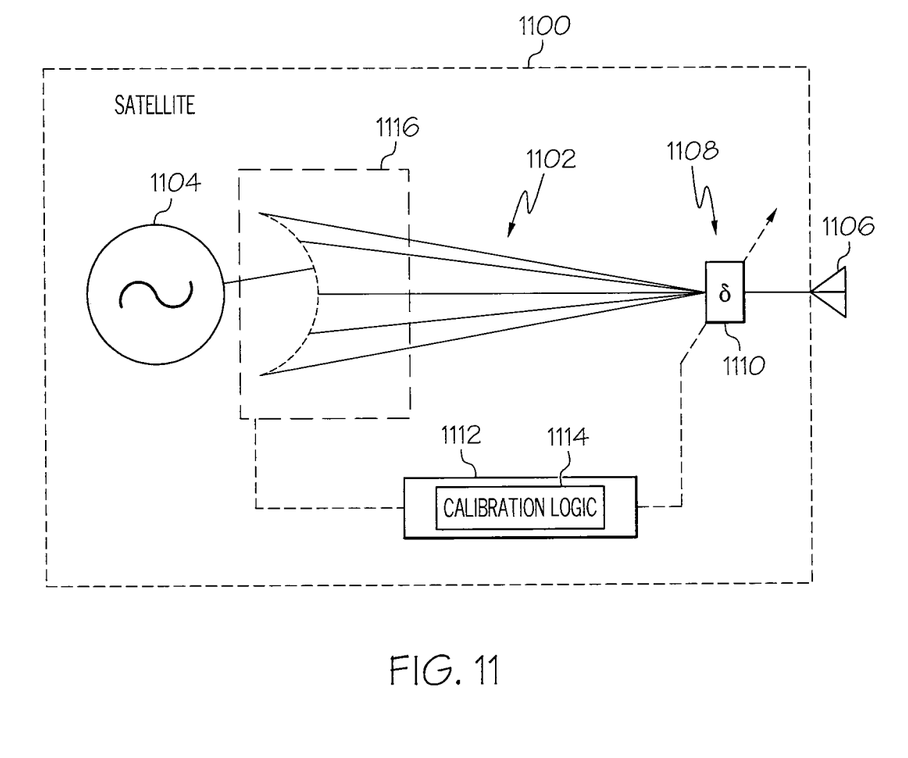
FIG. 11 is a block schematic diagram of an example of a satellite for correcting for time delay variations between a plurality of signal paths from a signal source to a transmit antenna of the satellite in accordance with an embodiment of the present disclosure.

FIG. 11 is a block schematic diagram of an example of a satellite 1100 for correcting for time delay variations between a plurality of signal paths 1102 from a signal source 1104 to at least one transmit antenna 1106 of the satellite 1100 in accordance with an embodiment of the present disclosure. The satellite 1100 includes a feature 1108 for correcting for time delay variations between signal paths within the satellite 1100 rather than as previously described by a receiver on the ground. The satellite 1100 may include a programmable phase shifter 1110 or similar device to add a signal delay to the signal path 1102 within the satellite 1100. The programmable phase shifter 1110 may be controlled by a processor 1112 including calibration logic 1114 coupled to a switch mechanism 1116. The calibration logic 1114 may determine the time delay corresponding to the signal path 1102 currently being used by the satellite 1100 and the calibration logic may program the phase shifter 1110 to apply the appropriate calibrated time delay value based on the signal path being used. The applied signal delay would complement the calibrated time delay value of the signal path being used, so the total time delay between the signal source and the transmit antenna would be constant or at least to a large extent constant for which ever signal path is being used. In this case, no correction would need to be applied by the receiver.

The programmable phase shifter 1110 can be inserted anywhere in the path between the signal source 1104 and the transmit antenna 1106, so long as all signal paths 1102 go through it. For example, the programmable phase shifter could go before the transmit antenna 1106 (as in FIG. 11) or it could go right at the output of the signal source 1104.

Figure 12:
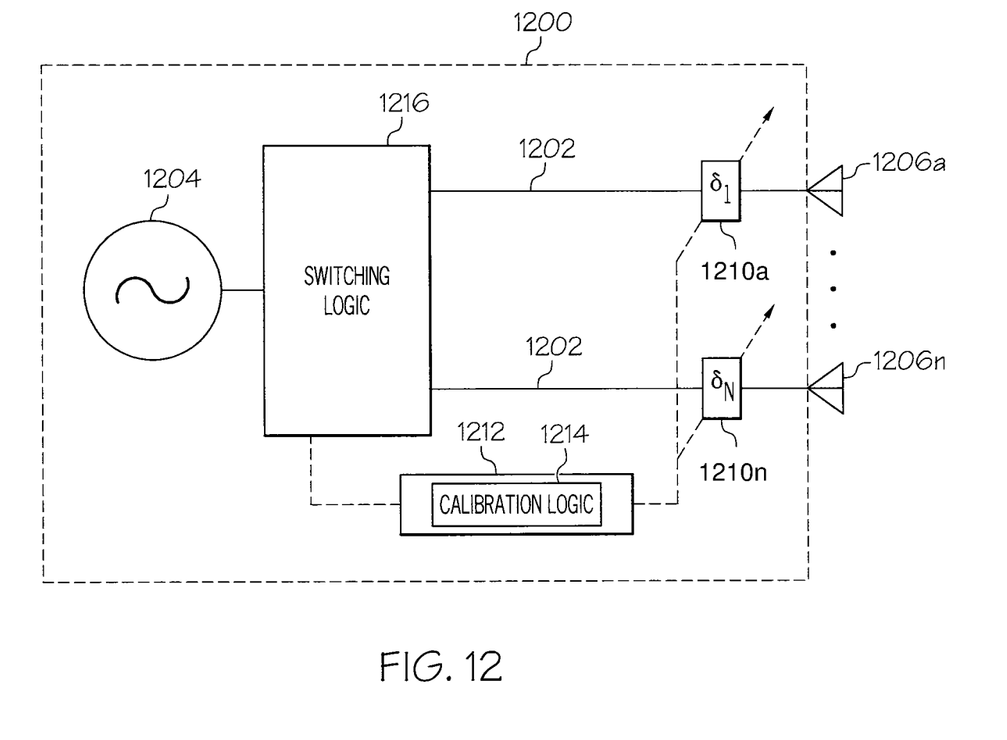
FIG. 12 is a block schematic diagram of an example of a satellite for correcting for time delay variations between a plurality of signal paths from a signal source to a plurality of transmit antennas of the satellite in accordance with an embodiment of the present disclosure.

FIG. 12 is a block schematic diagram of an example of a satellite 1200 for correcting for time delay variations between a plurality of signal paths 1202 from a signal source 1204 to a plurality of transmit antennas 1206a-1206n of the satellite 1200 in accordance with an embodiment of the present disclosure. The satellite 1200 may include programmable phase shifter 1210a-1210n associated with each signal path 1202. A processor 1212 including calibration logic 1214 may be coupled between switching logic 1216 and each of the programmable phase shifters 1210a-1210n to control the phase shifters to add the proper time delay to correct for time delay variation between the signal paths 1202.

In accordance with another embodiment, carrier phase discontinuities that are caused by signal path switching may be minimized by ensuring that the switching occurs primarily between signal paths with similar time delays for certain known periods of time. For example, if some portion of the signal paths in the satellite (for example, 10% of them) have a calibrated time delay that is within a specified threshold (for example, 0.1 nanoseconds), then the satellite may choose to use only those signal paths for some period of time (for example, 1 second). A navigation receiver tracking the satellite signal during that period of time (in this example, 1 second) could treat the signal as a continuous signal, knowing that the error due to signal path switching will be less than the specified threshold (in this example, 0.1 nanoseconds).

A further embodiment may involve minimizing the time delay variation that is caused by signal path switching by ensuring that the signal path selection is maintained at a single path for certain known periods. For example, if a single path is maintained for each antenna beam during its transit across a point on the Earth, the calibration can be made on a beam by beam basis. A navigation receiver tracking the satellite signal could treat the signal as a continuous signal by using individual beam calibration values.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for correcting for time delay variations between a plurality of selectable signal paths from a signal source to at least one transmit antenna of a satellite, the method comprising:
    measuring a time delay for each of the plurality of selectable signal paths; and
    correcting a signal for a time delay variation based on the time delay for a currently used signal path that is being used by the satellite to transmit the signal to a receiver, the currently used signal path being selected from the plurality of selectable signal paths from the signal source to the at least one transmit antenna by a switch mechanism and the corrected signal being usable for at least one of navigation, determining a geographic location and determining time.

2. The method of claim 1, wherein correcting the signal further comprises removing a discontinuity in the signal caused by switching from one of the plurality of selectable signal paths to the currently used signal path.

3. The method of claim 1, wherein correcting the signal for the time delay variation comprises correcting the signal for the time delay variation by the receiver applying a calibrated time delay value, wherein the calibrated time delay value is determined from the measured time delay for the currently used signal path.

4. The method of claim 3, further comprising transmitting the calibrated time delay value to the receiver for the currently used signal path, wherein the calibrated time delay value is transmitted to the receiver by one of the satellite that generated the signal, another satellite, and a terrestrial network.

5. The method of claim 3, further comprising:
    transmitting signal path identification data to the receiver, the signal path identification data comprising a unique identifier corresponding to the currently used signal path by the satellite; and
    using the signal path identification data to reference into a look-up table by the receiver to determine the calibrated time delay value.

6. The method of claim 5, wherein the signal path identification data is transmitted to the receiver by one of the satellite that generated the signal, another satellite, and a terrestrial network.

7. The method of claim 5, further comprising at least one of:
    programming at least a portion of the look-up table into a memory of the receiver;
    broadcasting at least a portion of the look-up table from the satellite that generated the signal;
    broadcasting at least a portion of the look-up table from another satellite; and
    broadcasting at least a portion of the look-up table from a terrestrial network.

8. The method of claim 5, further comprising at least one of:
    programming at least a portion of the look-up table into a memory of the receiver;
    downloading at least a portion of the look-up table from the satellite that generated the signal by the receiver;
    downloading at least a portion of the look-up table from another satellite by the receiver; and
    downloading at least a portion of the look-up table from a terrestrial network by the receiver.

9. The method of claim 5, further comprising determining at least one of:
    authentication of at least one of a user of the receiver and the receiver to receive at least one of the calibrated time delay value, the signal path identification data and the look-up table; and
    authorization of at least one of the user and the receiver to receive at least one of the calibrated time delay value, the signal path identification data and the look-up table.

10. The method of claim 5, wherein the look-up table comprises one of at least two versions and at least two levels.

11. The method of claim 10, wherein at least one version or one level of the look-up table comprises more precise data than the at least one other version or level of the look-up table.

12. The method of claim 11, wherein the one version or the one level corresponds to a level of service (LoS) higher than a LoS of the at least one other version or level.

13. The method of claim 11, wherein the one version or the one level corresponds to a quality of service (QoS) higher than a QoS of the at least one other version or level.

14. The method of claim 13, further comprising a plurality of tiers of quality of service each corresponding to a different version or level of preciseness of the look-up table.

15. The method of claim 14, wherein each tier comprises a different factor of error incorporated into it.

16. The method as in claim 15, wherein the QoS comprises at least two tiers, a highest quality of service being associated with a level comprising a least amount of error and a lowest quality of service being associated with a level comprising a most amount of error.

17. The method of claim 1, further comprising measuring the time delay for at least a portion of the plurality of signal paths at least one of before the satellite is launched and after the satellite is launched.

18. The method of claim 17, wherein measuring the time delay for at least the portion of signal paths after the satellite is launched comprises receiving signals from the satellite by a ground station.

19. The method of claim 1, wherein the satellite is at least one of a Lower Earth Orbiting (LEO) satellite, a Medium Earth Orbiting (MEO) satellite, and a Geosynchronous Earth Orbiting (GEO) satellite.

20. The method of claim 1, wherein correcting the signal for the time delay variation comprises correcting the signal for the time delay variation by the satellite applying a calibrated time delay value.

21. The method of claim 20, wherein applying the calibrated time delay value comprises adding a time delay to the measured time delay for the currently used signal path that provides a total time delay for each signal path that is substantially equal.

22. The method of claim 1, further comprising minimizing carrier phase discontinuities caused by switching between signal paths, by switching between signal paths with substantially similar time delays for a predetermined time period.

23. A method for correcting for time delay variations between a plurality of selectable signal paths from a signal source to at least one transmit antenna of a satellite, the method comprising:
    transmitting a signal by a currently used signal path of the plurality of selectable signal paths of the satellite, the currently used signal path being selected from the plurality of selectable signal paths from the signal source to the at least one transmit antenna by a switch mechanism; and correcting the signal for a time delay variation of the currently used signal path by applying a calibrated time delay value for the currently used signal path, wherein the calibrated time delay value is determined from a measured time delay for the currently used signal path, the corrected signal being usable for at least one of navigation, determining a geographic location and determining time.

24. The method of claim 23, wherein correcting the signal for the time delay variation comprises correcting the signal by at least one of the satellite and a receiver that receives the signal.

25. A satellite comprising:
a signal source for generating a signal;
at least one transmit antenna;
a plurality of selectable signal paths between the signal source and the at least one transmit antenna, the plurality of selectable signal paths comprising time delay variations between the signal source and the at least one transmit antenna;
a processor; and
a module operating on the processor to determine a time delay variation based on the time delay for a currently used signal path that is being used by the satellite to transmit signals to a receiver, the currently used signal path being selected from the plurality of selectable signal paths by a switch mechanism and the time delay variation being used to correct the signal and the corrected signal being usable for at least one of navigation, determining a geographic location and determining time.

26. The satellite of claim 25, further comprising a mechanism on the satellite to correct for the time delay variation by adding a time delay to a measured time delay for the currently used signal path that provides a total time delay for each selected signal path to be substantially equal.

27. The satellite of claim 25, further comprising:
calibration logic to determine a calibrated time delay value based on the currently used signal path; and
a programmable phase shifter to correct the signal for the time delay variation using the calibrated time delay value.

28. The satellite of claim 25, further comprising a transmitter to transmit a calibrated time delay value to a receiver, the receiver applying the calibrated time delay value to the signal to correct for the time delay variation for the currently used signal path, the calibrated time delay value being determined from a measured time delay for the signal path that is currently being used.

29. The satellite of claim 25, further comprising a transmitter to transmit signal path identification data to the receiver, the signal path identification data being used by the receiver to reference into a look-up table to determine a calibrated time delay value to correct for the time delay variation for the currently used signal path being used by the satellite, the calibrated time delay value being determined from a measured time delay for the currently used signal path.

30. A receiver comprising:
an antenna for receiving a signal from a satellite, wherein the satellite comprises a plurality of selectable signal paths from a signal source to at least one transmit antenna, the plurality of selectable signal paths comprising time delay variations between the signal source and the at least one transmit antenna;
a processor; and
a module operating on the processor to correct the signal for a time delay variation based on a time delay for a currently used signal path that is being used by the satellite to transmit signals to the receiver, the corrected signal being usable for at least one of navigation, determining a geographic location, and determining time, wherein the currently used signal path is selected from the plurality of selectable signal paths; and
a look-up table, the receiver receiving a unique identifier corresponding to the currently used signal path and the receiver being adapted to use the unique identifier to reference into the look-up table to determine a calibrated time delay value for the currently used signal path in the satellite to correct the signal from the satellite.

31. The receiver of claim 30, wherein the receiver corrects the signal for the time delay variation by applying a calibrated time delay value, the calibrated time delay value being determined from a measured time delay for the currently used signal path.

32. The method of claim 5, wherein each of the plurality of selectable signal paths has a unique integer identifier.

* * * * *